(12) United States Patent
Liang et al.

(10) Patent No.: US 10,518,756 B1
(45) Date of Patent: Dec. 31, 2019

(54) MOVABLE VEHICLE AND BRAKE MODULE THEREOF

(71) Applicant: Wistron Corp., New Taipei (TW)

(72) Inventors: Chen Yi Liang, New Taipei (TW); Kun-Ting Xie, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/391,999

(22) Filed: Apr. 23, 2019

(30) Foreign Application Priority Data

Nov. 21, 2018 (TW) .............................. 107141376 A

(51) Int. Cl.

| | | |
|---|---|---|
| B60T 1/06 | (2006.01) | |
| B60B 19/12 | (2006.01) | |
| B60R 99/00 | (2009.01) | |
| B60T 1/04 | (2006.01) | |
| F16D 55/224 | (2006.01) | |
| F16D 65/18 | (2006.01) | |
| B60T 7/02 | (2006.01) | |
| F16D 125/60 | (2012.01) | |
| F16D 121/14 | (2012.01) | |

(52) U.S. Cl.
CPC ................ B60T 1/06 (2013.01); B60B 19/12 (2013.01); B60R 99/00 (2013.01); B60T 1/04 (2013.01); B60T 7/02 (2013.01); F16D 55/2245 (2013.01); F16D 65/18 (2013.01); *F16D 2121/14* (2013.01); *F16D 2125/60* (2013.01)

(58) Field of Classification Search
CPC ................ B60T 1/06; B60T 1/00; B60T 1/02
See application file for complete search history.

(56) References Cited

U.S. PATENT DOCUMENTS

| | | | |
|---|---|---|---|
| 2006/0076822 A1 | 4/2006 | Lamprich et al. | |
| 2006/0076833 A1* | 4/2006 | Kojima | B60L 3/0007 307/10.1 |

FOREIGN PATENT DOCUMENTS

| | | |
|---|---|---|
| CN | 106240673 A | 12/2016 |
| CN | 107176256 A | 9/2017 |
| TW | M534690 U | 1/2017 |
| TW | 201813831 A | 4/2018 |

* cited by examiner

*Primary Examiner* — John D Walters
*Assistant Examiner* — James J Triggs

(57) ABSTRACT

A brake module is provided. The brake module is for braking at least one omnidirectional wheel, and the omnidirectional wheels include at least one major wheel and a plurality of minor wheels. The brake module includes a base, a first brake arm, a first major brake block and a first minor brake block. The first major brake block is disposed on the first brake arm. The first minor brake block is disposed on the first brake arm. When the first brake arm is in a first orientation, the first major brake block and the first minor brake block are separated from the omnidirectional wheel, and when the first brake arm is in a second orientation, the first major brake block abuts the major wheel, and the first minor brake block abuts one of the minor wheels.

18 Claims, 9 Drawing Sheets

US 10,518,756 B1

MOVABLE VEHICLE AND BRAKE MODULE THEREOF

CROSS REFERENCE TO RELATED APPLICATIONS

This Application claims priority of Taiwan Patent Application No. 107141376, filed on Nov. 21, 2018, the entirety of which is incorporated by reference herein.

BACKGROUND OF THE INVENTION

Field of the Invention

The present invention relates to a brake module, and in particular to a brake module for braking an omnidirectional wheel.

Description of the Related Art

The omnidirectional wheel includes a major wheel and a plurality of minor wheels. When the conventional V-type brake module or the C-type brake module brakes the omnidirectional wheel, the brake block of the brake module only brakes the major wheel and cannot brake the minor wheel. When the omnidirectional wheel is utilized on a wheelchair or a walker, a user with disabilities will not be able to effectively brake the omnidirectional wheel, and the user is therefore in danger.

BRIEF SUMMARY OF THE INVENTION

In one embodiment, a brake module is provided. The brake module is connected to a brake cable of a movable vehicle to brake at least one omnidirectional wheel, and the omnidirectional wheels include at least one major wheel and a plurality of minor wheels. The brake module includes a base, a first brake arm, a first major brake block and a first minor brake block. The base is disposed on the movable vehicle. The first brake arm pivots on the base. The first major brake block is disposed on the first brake arm. The first minor brake block is disposed on the first brake arm, wherein when the brake cable is pulled, the first brake arm is moved between a first orientation and a second orientation relative to the base, and when the first brake arm is in the first orientation relative to the base, the first major brake block and the first minor brake block are separated from the omnidirectional wheel, and when the first brake arm is in the second orientation relative to the base, the first major brake block abuts the major wheel, and the first minor brake block abuts one of the minor wheels.

In another embodiment, a movable vehicle is provided. The movable vehicle includes a bracket, an omnidirectional wheel, a base, a first brake arm, a first major brake block and a first minor brake block. The omnidirectional wheel is disposed on the bracket, wherein the omnidirectional wheel includes at least one major wheel and a plurality of minor wheels. The base is disposed on the bracket. The first brake arm pivots on the base. The first major brake block is disposed on the first brake arm. The first minor brake block is disposed on the first brake arm, wherein the first brake arm is moved between a first orientation and a second orientation relative to the base, and when the first brake arm is in the first orientation relative to the base, the first major brake block and the first minor brake block are separated from the omnidirectional wheel, and when the first brake arm is in the second orientation relative to the base, the first major brake block abuts the major wheel, and the first minor brake block abuts one of the minor wheels.

Utilizing the brake module of the embodiment of the invention, the major brake block and the minor brake block simultaneously brake the major wheel and the minor wheel of the omnidirectional wheel. Therefore, the brake module sufficiently brakes the major wheel and the minor wheel of the omnidirectional wheel. Particularly, when the brake module is utilized to the wheelchair or the walker, the safety of the user is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
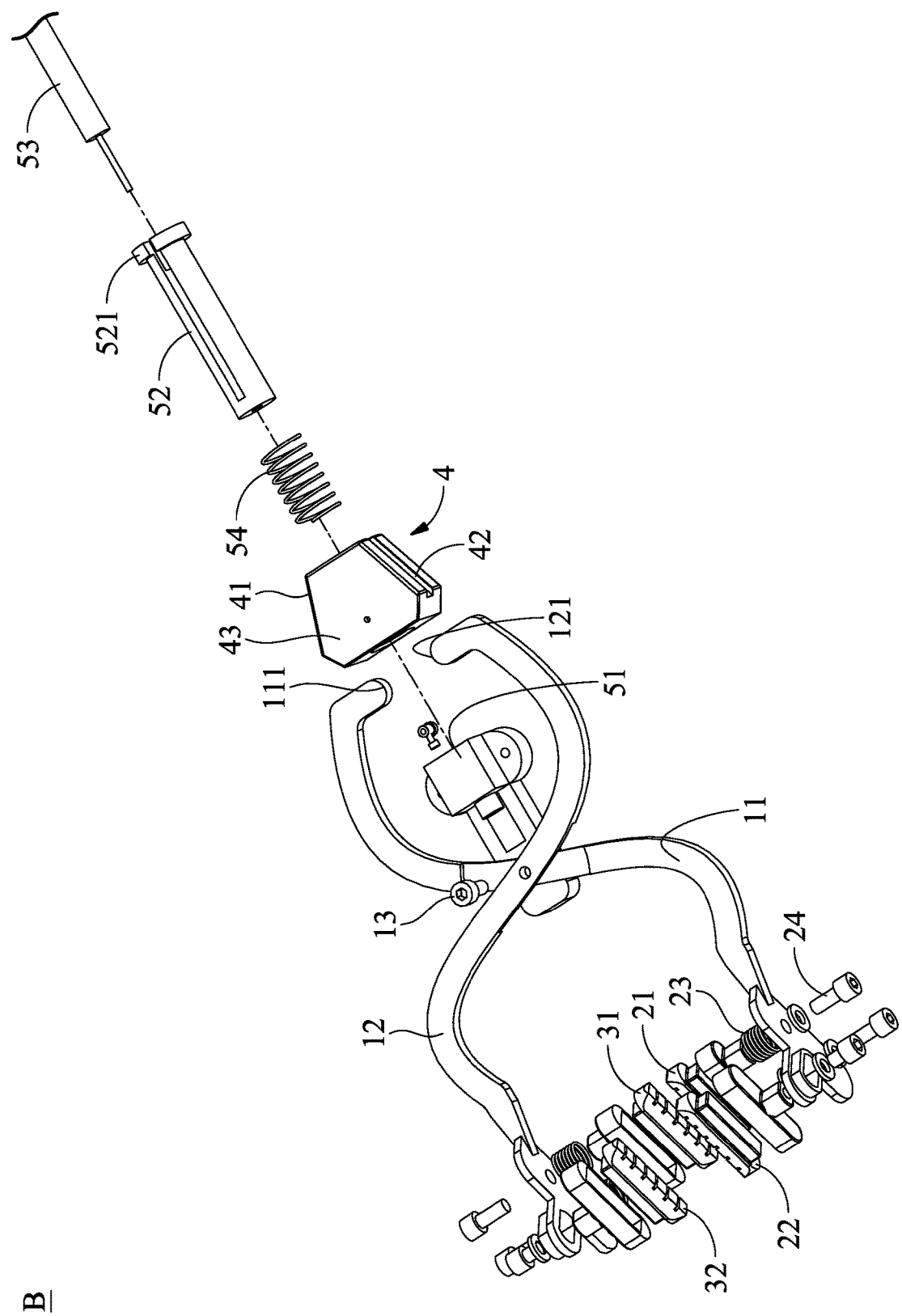
FIG. 1A is an exploded view of a brake module of an embodiment of the invention.
Figure 1B:
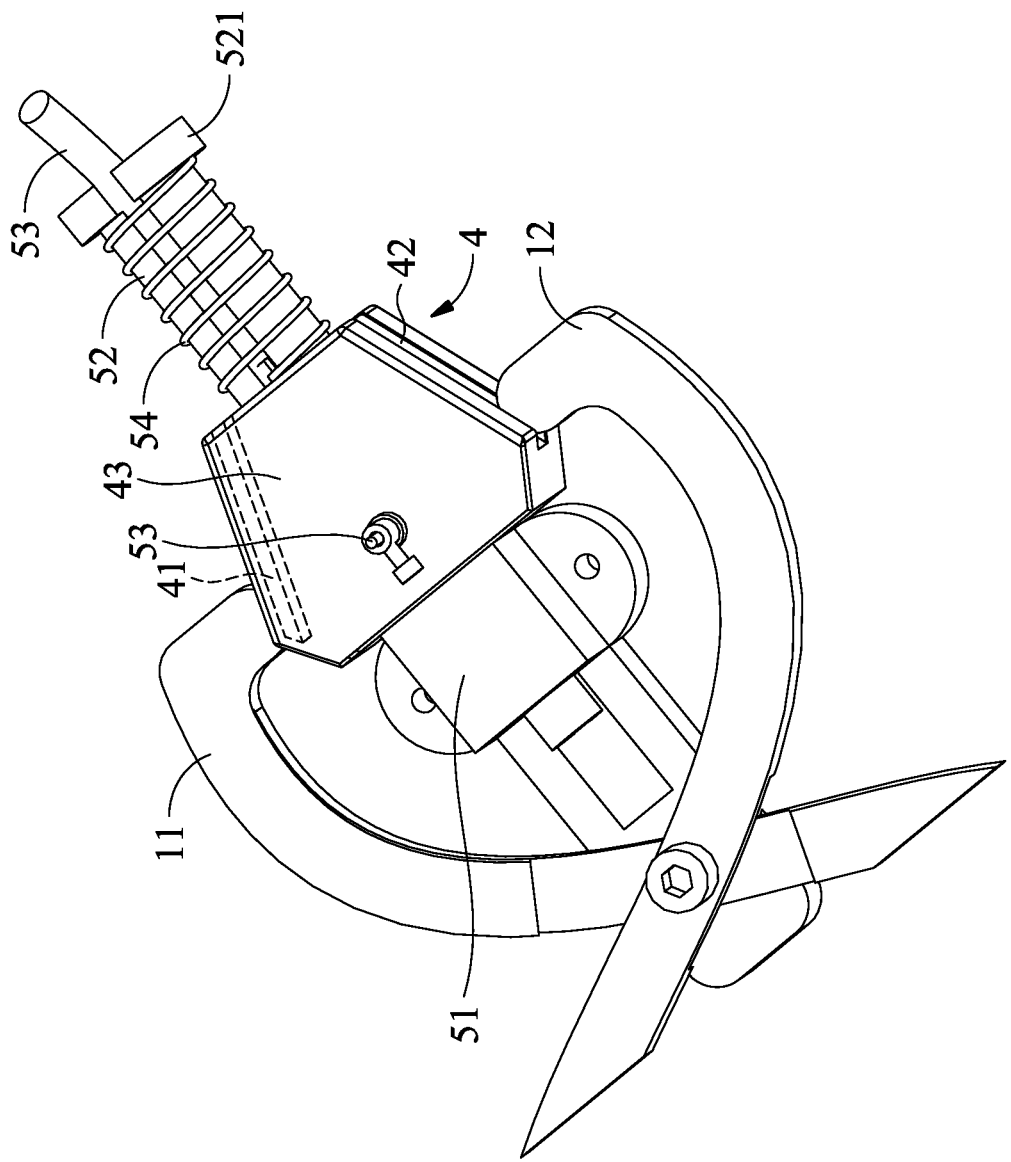
FIG. 1B is an assembled view of a portion of the brake module of the embodiment of the invention.

FIG. 1A is an exploded view of the brake module B of an embodiment of the invention. FIG. 1B is an assembled view of a portion of the brake module B of the embodiment of the invention. With reference to FIGS. 1A and 1B, the brake module B is utilized to brake at least one omnidirectional wheel W (not shown). The brake module B includes a first brake arm 11, a second brake arm 12, a brake arm shaft 13, a first major brake block 21 and a first minor brake block 22. The first brake arm 11 pivots on the second brake arm 12 and the base 51 via the brake arm shaft 13. The first major brake block 21 is disposed on the first brake arm 11. The first minor brake block 22 is disposed on the first brake arm 11.

With reference to FIGS. 2A, 2B, 2C and 2D, the first brake arm 11 is moved between a first orientation (FIGS. 2A and 2C) and a second orientation (FIGS. 2B and 2D) relative to the second brake arm 12. When the first brake arm 11 is in the first orientation (FIGS. 2A and 2C) relative to the second brake arm 12, the first major brake block 21 and the first minor brake block 22 are separated from the omnidirectional wheel W. With reference to FIG. 2E, the omnidirectional wheel W includes at least one major wheel 81 and a plurality of minor wheels 82. When the first brake arm 11 is in the second orientation (FIGS. 2B and 2D) relative to the second brake arm 12, the first major brake block 21 abuts the major wheel 81, and the first minor brake block 22 abuts one of the minor wheels 82.

With reference to FIGS. 1A and 1B, in one embodiment, the first major brake block 21 is located between the first minor brake block 22 and the brake arm shaft 13. In this embodiment, the brake module B further includes a second major brake block 31 and a second minor brake block 32. The second major brake block 31 is disposed on the second brake arm 12. The second minor brake block 32 is disposed on the second brake arm 12. The first major brake block 21 corresponds to the second major brake block 31, and the first minor brake block 22 corresponds to the second minor brake block 32.

With reference to FIGS. 1A, 1B, 2A and 2B, in one embodiment, the brake module B further includes a sliding block 4. The sliding block 4 includes a first guiding slot 41 and a second guiding slot 42. The first guiding slot 41 and the second guiding slot 42 extending separately. The first brake arm 11 includes a first free end 111. The second brake arm 12 includes a second free end 121. The first free end 111 is inserted into the first guiding slot 41. The second free end 121 is inserted into the second guiding slot 42. The sliding block 4 is moved between a first sliding block position (FIG. 2A) and a second sliding block position (FIG. 2B) to push and pivot the first brake arm 11 relatively to the second brake arm 12. When the sliding block 4 is in the first sliding block position (FIG. 2A), the first brake arm 11 is in the first orientation relative to the second brake arm 12. When the sliding block 4 is in the second sliding block position (FIG. 2B), the first brake arm 11 is in the second orientation relative to the second brake arm 12.

With reference to FIGS. 1A and 1B, in one embodiment, the brake module B further includes a base 51, a sliding rod 52 and a brake cable 53. The sliding rod 52 is affixed to the base 51. The sliding block 4 is slidably connected to the sliding rod 52. The brake cable 53 is connected to the sliding block 4. The brake cable 53 pulls the sliding block 4 to move between the first sliding block position and the second sliding block position along the sliding rod 52.

In one embodiment, the brake module B can only include the first brake arm 11, and the second brake arm 12 is omitted. The first brake arm 11 pivots on the base 51 to brake the omnidirectional wheel.

With reference to FIGS. 1A and 1B, in one embodiment, the brake module further includes a recovery spring 54. The sliding rod 52 includes a flange 521. One end of the recovery spring 54 abuts the flange 521. The other end of the recovery spring 54 abuts the sliding block 4. When the sliding block 4 is in the second sliding block position, the recovery spring 54 applies a recovery elastic force to the sliding block 4 to move the sliding block 4 back to the first sliding block position automatically.

With reference to FIGS. 1A and 1B, in one embodiment, the brake cable 53 passes through the sliding rod 52 and the sliding block 4, and one end of the brake cable 53 is affixed to a sliding block surface 43 of the sliding block 4.

Figure 2A:
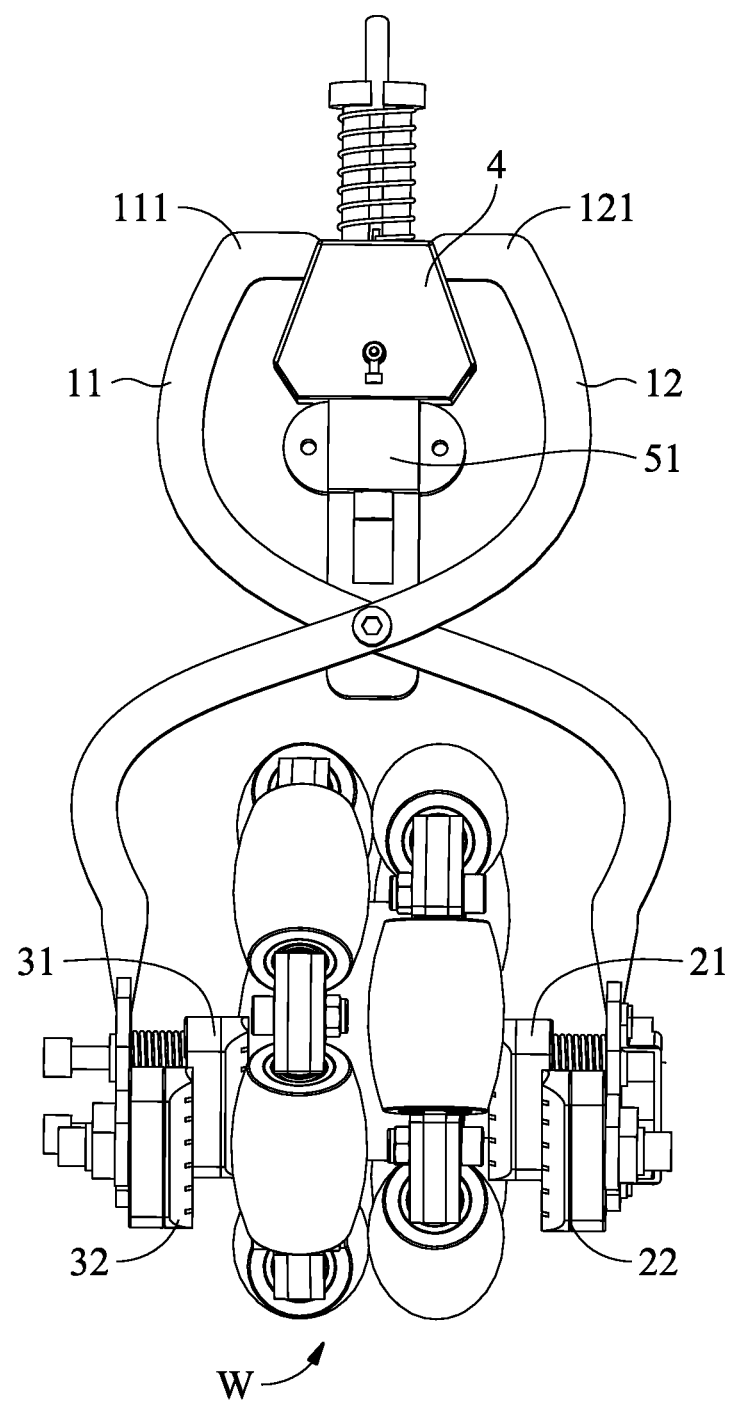
FIG. 2A shows the brake module of the embodiment of the invention, wherein a first brake arm is in a first orientation relative to a base.
Figure 2B:
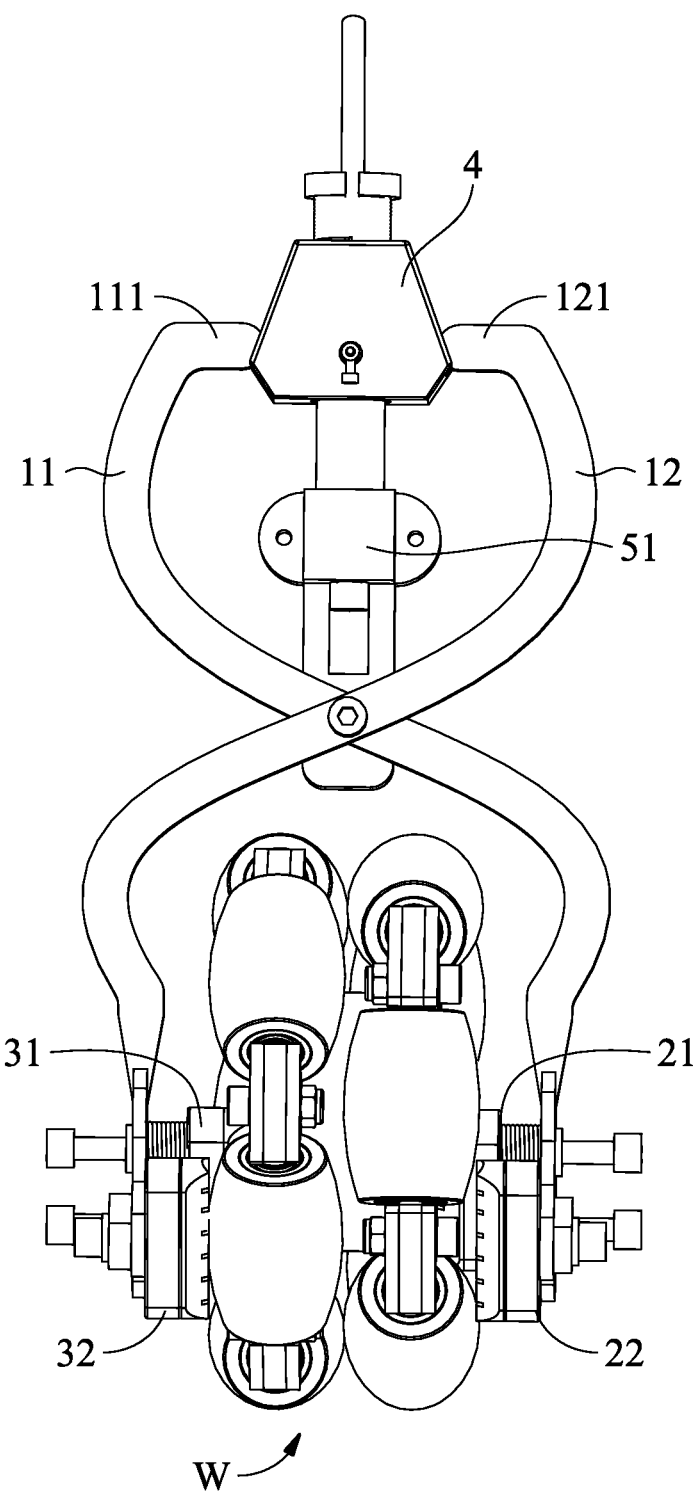
FIG. 2B shows the brake module of the embodiment of the invention, wherein the first brake arm is in a second orientation relative to the base.
Figure 2C:
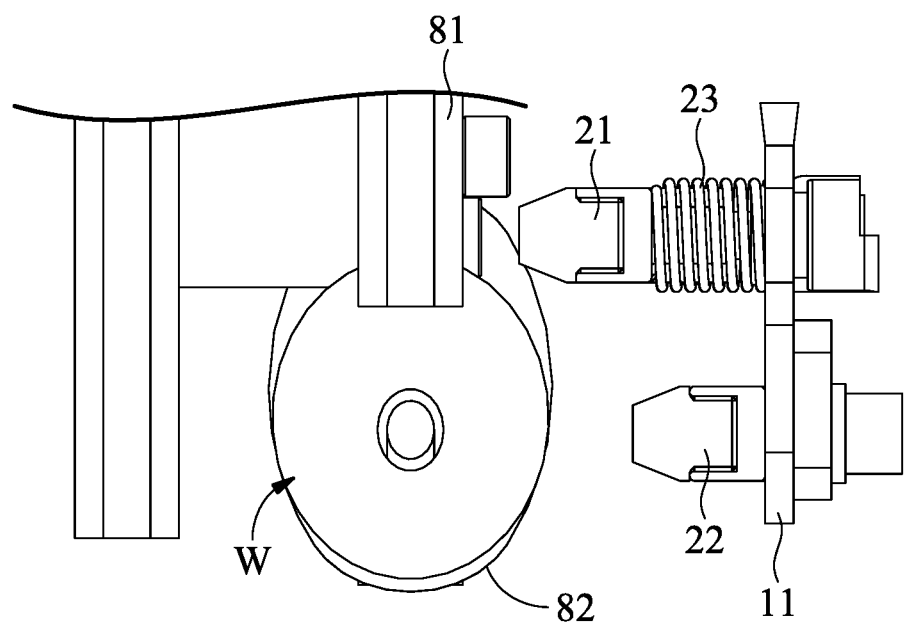
FIG. 2C shows the brake module of the embodiment of the invention, wherein a first major brake block and a first minor brake block are separated from an omnidirectional wheel.
Figure 2D:
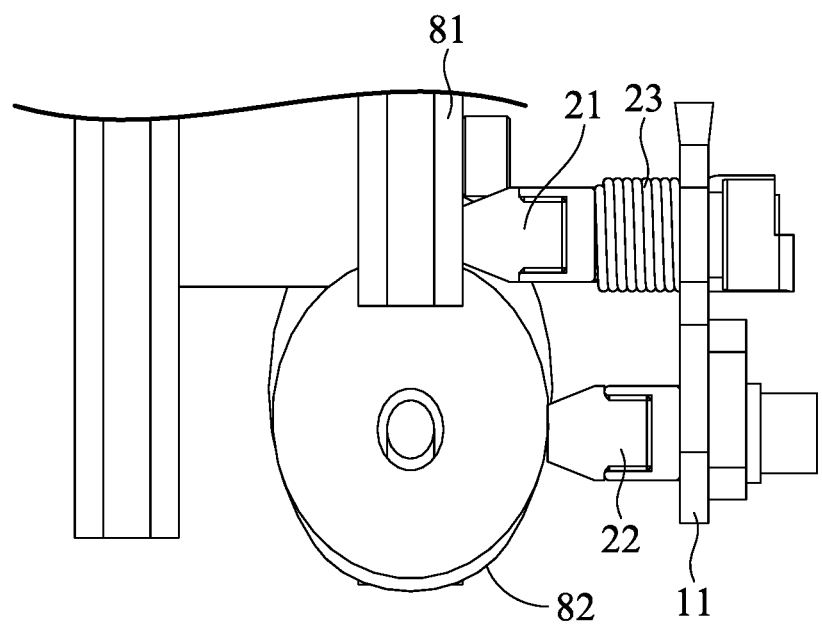
FIG. 2D shows the brake module of the embodiment of the invention, wherein the first major brake block and the first minor brake block abut the omnidirectional wheel.
Figure 2E:
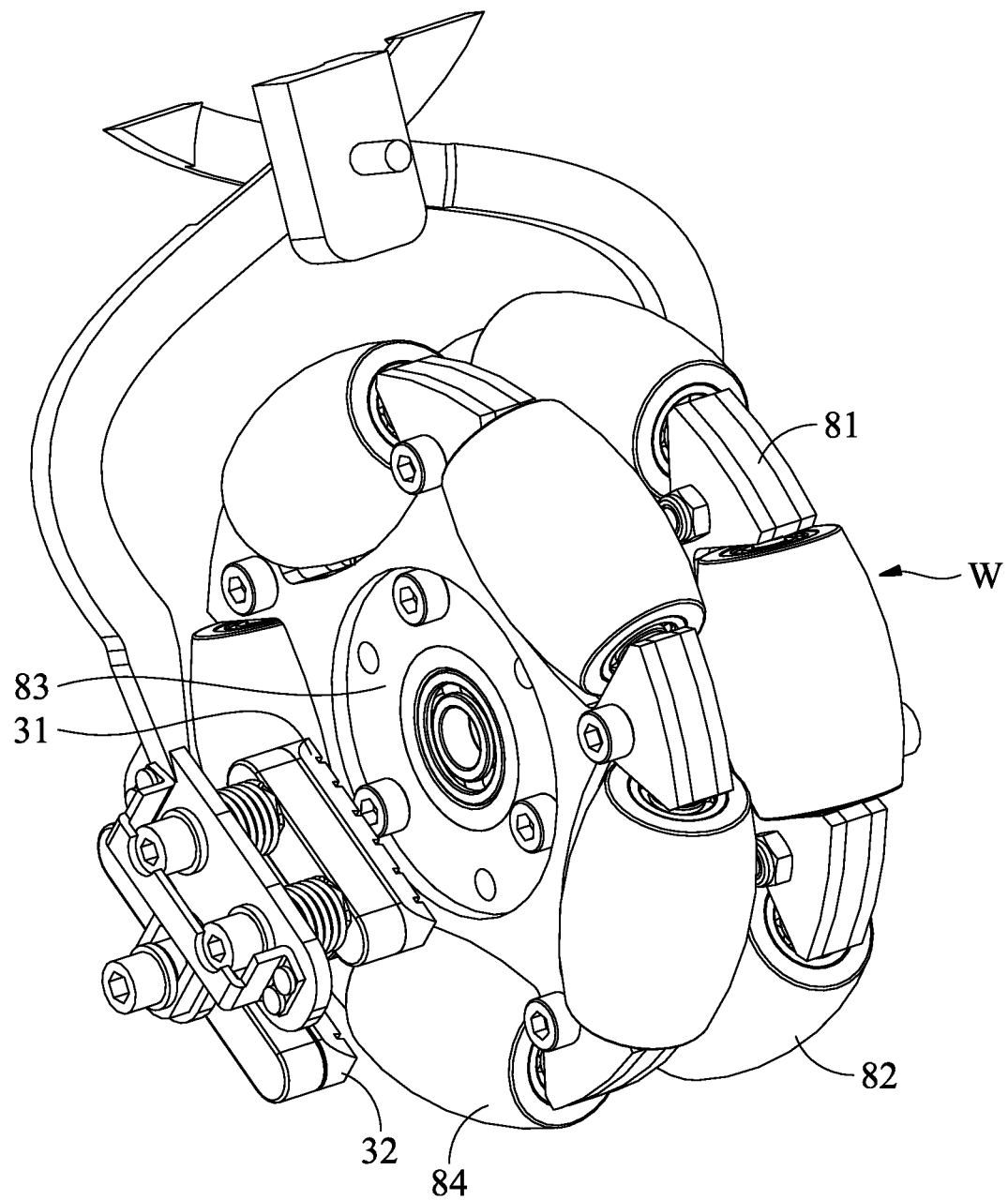
FIG. 2E shows the details of the omnidirectional wheel of the embodiment of the invention.

With reference to FIGS. 1A, 2C and 2D, in one embodiment, the brake module B further includes a brake block spring 23, wherein the brake block spring 23 is disposed between the first major brake block 21 and the first brake arm 11. In one embodiment, the brake module B further includes a brake block post 24, the brake block post 24 is disposed on the first brake arm 11, the first major brake block 21 slides along the brake block post 24, and the brake block spring 23 is telescoped on the brake block post 24. In another embodiment, the brake block post 24 can be replaced by bolt, thread rod, pin or other elements. Utilizing the brake block spring 23 of the embodiment of the invention, the stroke of the first major brake block 21 can be modified.

Figure 3A:
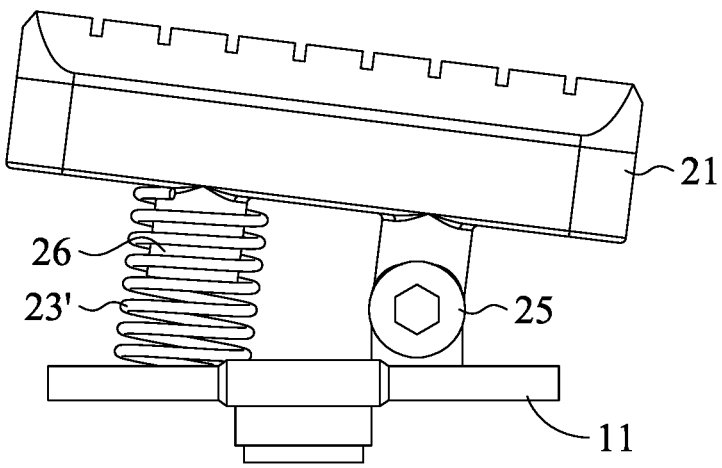
FIGS. 3A and 3B show a brake module of a modified embodiment of the invention.
Figure 3B:
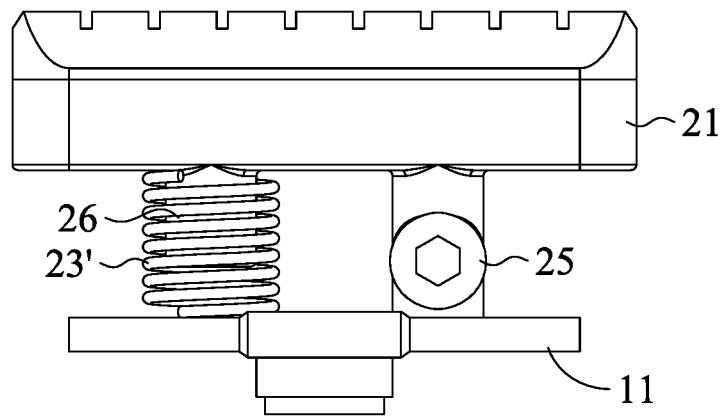

FIGS. 3A and 3B show a brake module of a modified embodiment of the invention. With reference to FIGS. 3A and 3B, in this embodiment, the brake module B further includes a brake block shaft 25, wherein the first major brake block 21 pivots on the first brake arm 11 via the brake block shaft 25. In this embodiment, the first major brake block 21 has a stopper 26 and a brake block spring 23'. The stopper 26 restricts the compression of the brake block spring 23'. Utilizing the brake block shaft 25, the stopper 26 and the brake block spring 23', the stroke of the first major brake block 21 can be modified.

Figure 4:
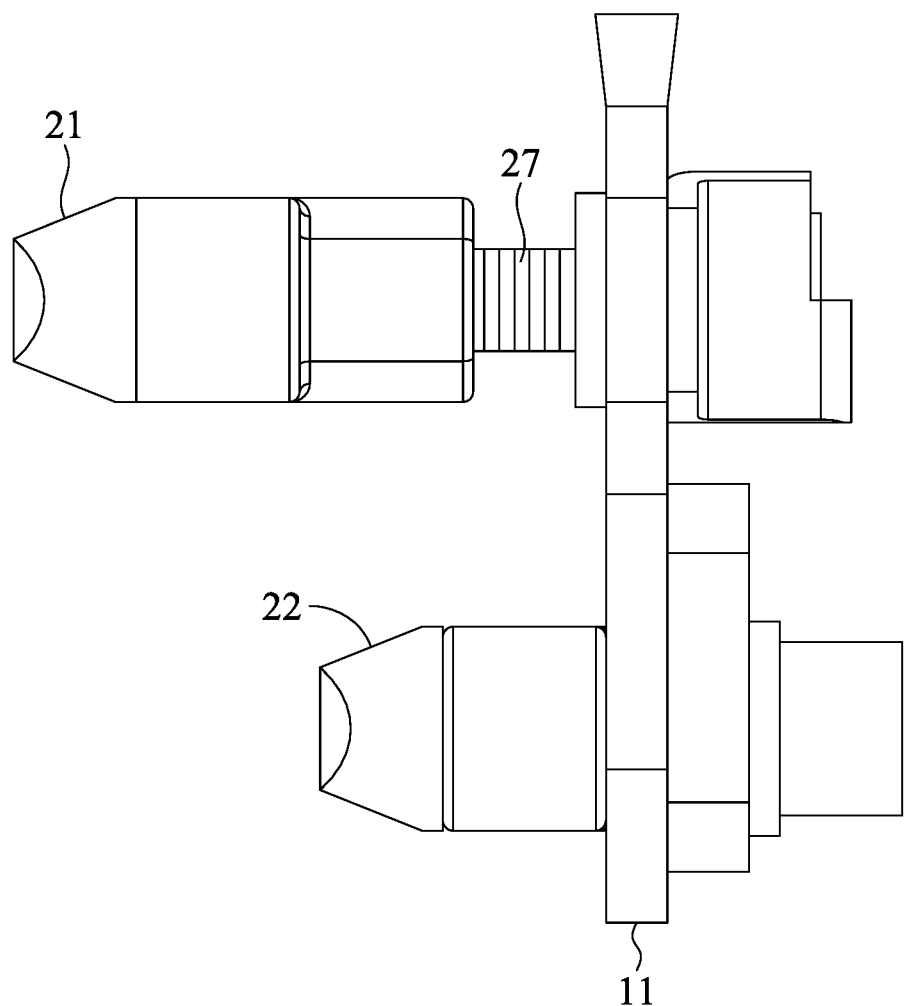
FIG. 4 shows a brake module of another modified embodiment of the invention.

FIG. 4 shows a brake module of another modified embodiment of the invention. With reference to FIG. 4, in this embodiment, the brake module B further includes a brake block bolt 27, wherein the first major brake block 21 is connected to the first brake arm 11 via the brake block bolt 27. Utilizing this embodiment of the invention, the brake block bolt 27 can adjust the position of the first major brake block 21, and make the first major brake block 21 to sufficiently contact and brake the major wheel 81 with the gradual wear of the first major brake block 21.

Figure 5:
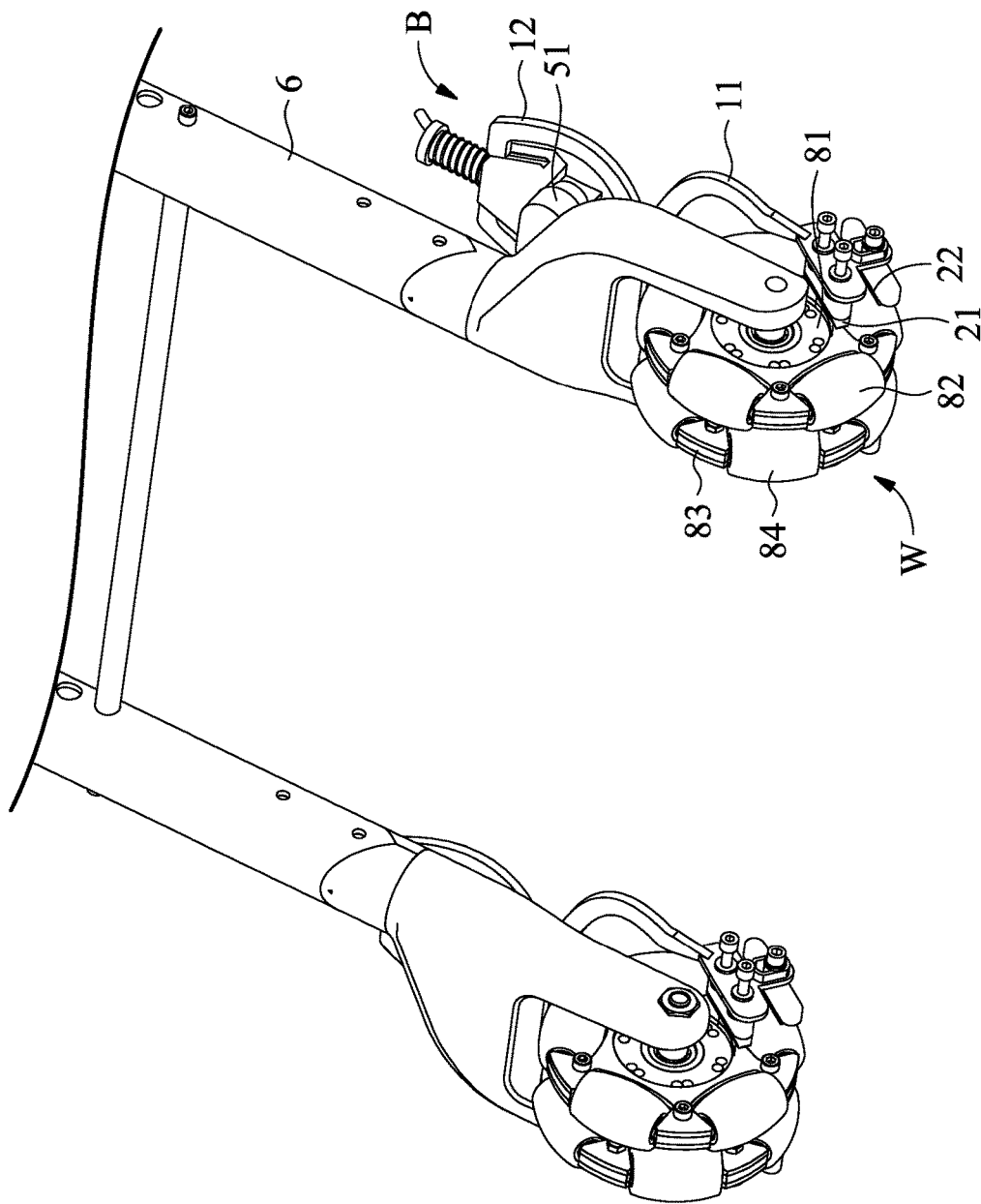
FIG. 5 shows a movable vehicle of an embodiment of the invention.

With reference to FIG. 5, in another embodiment, a movable vehicle R is provided. The movable vehicle R includes a bracket 6, the omnidirectional wheel W and the brake module B mentioned above. The omnidirectional wheel W is disposed on the bracket 6. In this embodiment, the brake module B is affixed to the bracket 6 via the base 51. In different embodiments, the base 51 is disposed on the bracket 6 by bolt, welding or integrally forming. The disclosure is not meant to restrict the invention.

With reference to FIGS. 1A, 2E and 5, in one embodiment, the omnidirectional wheel includes at least one major wheel 81, a plurality of minor wheels 82, a second major wheel 83 and a plurality of second minor wheels 84. The first minor wheels 82 are arranged in a circumferential direction of the first major wheel 81. The second minor wheels 84 are arranged in a circumferential direction of the second major wheel 83. When the first brake arm 11 is in the second orientation relative to the second brake arm 12, the first major brake block 21 abuts the first major wheel 81, the first minor brake block 22 is adapted to abut one of the first minor wheels 82, the second major brake block 31 abuts the second major wheel 83, and the second minor brake block 32 is adapted to abut one of the second minor wheels 84. In another embodiment, when the first minor brake block 22 abuts one of the first minor wheels 82, the second minor brake block 32 abuts two of the second minor wheels 84 simultaneously.

Utilizing the brake module of the embodiment of the invention, the major brake block and the minor brake block simultaneously brake the major wheel and the minor wheel of the omnidirectional wheel. Therefore, the brake module sufficiently brakes the major wheel and the minor wheel of the omnidirectional wheel. Particularly, when the brake module is utilized to the wheelchair or the walker, the safety of the user is improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brake module, wherein the brake module is connected to a brake cable of a movable vehicle to brake at least one omnidirectional wheel, and the at least one omnidirectional wheel comprises at least one major wheel and a plurality of minor wheels, comprising:
a base, disposed on the movable vehicle;
a first brake arm, pivoting on the base;
a first major brake block, disposed on the first brake arm; and
a first minor brake block, disposed on the first brake arm, wherein when the brake cable is pulled, the first brake arm is moved between a first orientation and a second orientation relative to the base, and when the first brake arm is in the first orientation relative to the base, the first major brake block and the first minor brake block are separated from the omnidirectional wheel, and when the first brake arm is in the second orientation relative to the base, the first major brake block abuts the major wheel, and the first minor brake block abuts one of the minor wheels.

2. The brake module as claimed in claim 1, further comprising a second brake arm and a brake arm shaft, wherein the first brake arm pivots on the second brake arm and the base via the brake arm shaft.

3. The brake module as claimed in claim 2, wherein the first major brake block is located between the first minor brake block and the brake arm shaft.

4. The brake module as claimed in claim 3, further comprising a second major brake block and a second minor brake block, wherein the second major brake block is disposed on the second brake arm, the second minor brake block is disposed on the second brake arm, the first major brake block corresponds to the second major brake block, and the first minor brake block corresponds to the second minor brake block.

5. The brake module as claimed in claim 3, further comprising a sliding block, wherein the sliding block comprises a first guiding slot and a second guiding slot, the first guiding slot and the second guiding slot extending separately, the first brake arm comprises a first free end, the second brake arm comprises a second free end, the first free end is inserted into the first guiding slot, the second free end is inserted into the second guiding slot, the sliding block is moved between a first sliding block position and a second sliding block position to push and pivot the first brake arm relatively to the second brake arm, and when the sliding block is in the first sliding block position, the first brake arm is in the first orientation relative to the second brake arm, and when the sliding block is in the second sliding block position, the first brake arm is in the second orientation relative to the second brake arm.

6. The brake module as claimed in claim 5, further comprising a sliding rod, wherein the sliding rod is affixed to the base, the sliding block is slidably connected to the sliding rod, the brake cable is connected to the sliding block, and the brake cable pulls the sliding block to move between the first sliding block position and the second sliding block position along the sliding rod.

7. The brake module as claimed in claim 6, further comprising a recovery spring, wherein the sliding rod comprises a flange, one end of the recovery spring abuts the flange, the other end of the recovery spring abuts the sliding block, and when the sliding block is in the second sliding block position, the recovery spring applies a recovery elastic force to the sliding block.

8. The brake module as claimed in claim 7, wherein the brake cable passes through the sliding rod and the sliding block, and one end of the brake cable is affixed to a sliding block surface of the sliding block.

9. The brake module as claimed in claim 1, further comprising a brake block spring, wherein the brake block spring is disposed between the first major brake block and the first brake arm.

10. The brake module as claimed in claim 9, further comprising a brake block post, the brake block post is disposed on the first brake arm, the first major brake block slides along the brake block post, and the brake block spring is telescoped on the brake block post.

11. The brake module as claimed in claim 1, further comprising a brake block shaft, wherein the first major brake block pivots on the first brake arm via the brake block shaft.

12. The brake module as claimed in claim 1, further comprising a brake block bolt, wherein the first major brake block is connected to the first brake arm via the brake block bolt.

13. A movable vehicle, comprising:
a bracket;
an omnidirectional wheel, disposed on the bracket, wherein the omnidirectional wheel comprises at least one major wheel and a plurality of minor wheels;
a base, disposed on the bracket;
a first brake arm, pivoting on the base;
a first major brake block, disposed on the first brake arm; and
a first minor brake block, disposed on the first brake arm, wherein the first brake arm is moved between a first orientation and a second orientation relative to the base, and when the first brake arm is in the first orientation relative to the base, the first major brake block and the first minor brake block are separated from the omnidirectional wheel, and when the first brake arm is in the second orientation relative to the base, the first major brake block abuts the major wheel, and the first minor brake block abuts one of the minor wheels.

14. The movable vehicle as claimed in claim 13, further comprising a second brake arm and a brake arm shaft, wherein the first brake arm pivots on the second brake arm and the base via the brake arm shaft.

15. The movable vehicle as claimed in claim 14, wherein the omnidirectional wheel comprises a first major wheel and a plurality of first minor wheels, the first minor wheels are arranged in a circumferential direction of the first major wheel, when the first brake arm is in the second orientation relative to the second brake arm, the first major brake block abuts the first major wheel, and the first minor brake block is adapted to abut one of the first minor wheels.

16. The movable vehicle as claimed in claim 15, wherein the omnidirectional wheel comprises a second major wheel and a plurality of second minor wheels, and the second minor wheels are arranged in a circumferential direction of the second major wheel.

17. The movable vehicle as claimed in claim 16, further comprising a second major brake block and a second minor brake block, wherein the second major brake block is disposed on the second brake arm, the second minor brake block is disposed on the second brake arm, the first major brake block corresponds to the second major brake block, and the first minor brake block corresponds to the second minor brake block, and when the first brake arm is in the second orientation relative to the second brake arm, the second major brake block abuts the second major wheel, and the second minor brake block is adapted to abut one of the second minor wheels.

18. The movable vehicle as claimed in claim 14, further comprising a sliding block, a sliding rod and a brake cable, wherein the sliding block comprises a first guiding slot and a second guiding slot, the first guiding slot and the second guiding slot extending separately, the first brake arm comprises a first free end, the second brake arm comprises a second free end, the first free end is inserted into the first guiding slot, the second free end is inserted into the second guiding slot, the sliding block is moved between a first sliding block position and a second sliding block position to push and pivot the first brake arm relatively to the second brake arm, and when the sliding block is in the first sliding block position, the first brake arm is in the first orientation relative to the second brake arm, and when the sliding block is in the second sliding block position, the first brake arm is in the second orientation relative to the second brake arm, wherein the sliding rod is affixed to the base, the sliding block is slidably connected to the sliding rod, the brake cable is connected to the sliding block, the brake cable pulls the sliding block to move between the first sliding block position and the second sliding block position along the sliding rod, and the base is affixed to the bracket.

* * * * *